E. B. AULT.
FEEDER FOR SOFT CANDY.
APPLICATION FILED MAY 29, 1920.

1,384,377. Patented July 12, 1921.

Inventor
E. B. Ault
By Geo. F. Kimmel
Attorney

UNITED STATES PATENT OFFICE.

EUGENE B. AULT, OF CALALLEN, TEXAS.

FEEDER FOR SOFT CANDY.

1,384,377. Specification of Letters Patent. Patented July 12, 1921.

Application filed May 29, 1920. Serial No. 385,358.

*To all whom it may concern:*

Be it known that I, EUGENE B. AULT, a citizen of the United States, residing at Calallen, in the county of Nueces and State of Texas, have invented certain new and useful Improvements in Feeders for Soft Candy, of which the following is a specification.

This invention relates to feeders for bees and more particularly to soft candy feeders to be used for feeding bees while in transit.

The main object of the invention is to provide a feeder which while meeting the requirements of the parcel post and express rules will yet furnish feed on which the bees will thrive and reach their destination in good condition.

Another object is to provide a feeder of this character which is so constructed as to prevent the candy from running and yet permit the bees to readily suck their feed and which permits the bees to have access to the feed as long as there is any left.

Another object is to provide such a feeder in which all danger of its becoming clogged with dead bees thereby starving the others is avoided.

Another object is to so construct such a feeder that the bees will not get stuck thereto and should the candy, owing to moist conditions of the atmosphere, become softer than normally, the softer portion will ooze out and bees will eat that first leaving the remainder in its original condition.

With these and other objects in view, the invention consists in certain novel features of construction as hereinafter shown and described and then specifically claimed.

Figure 1:
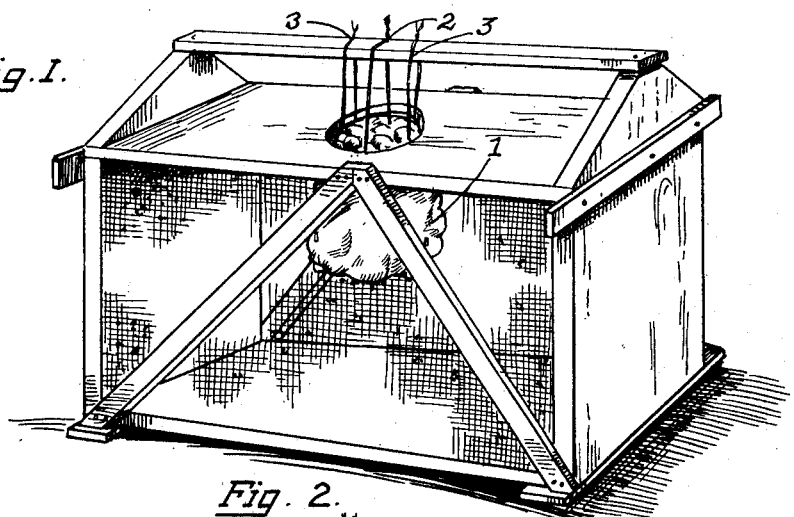
Figure 1 represents a portion of a cage with this improved feeder shown applied.
Figure 2:
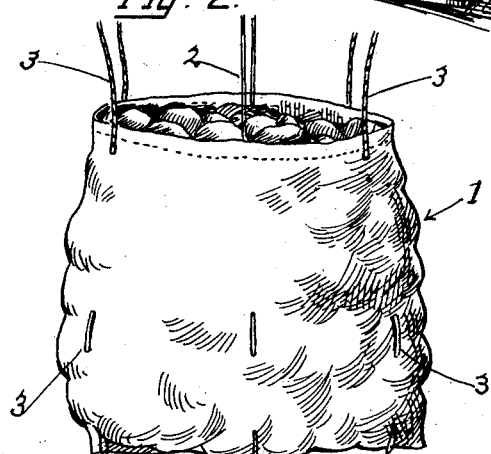
Fig. 2 is a side elevation of the feeder before the feed is placed therein.
Figure 3:
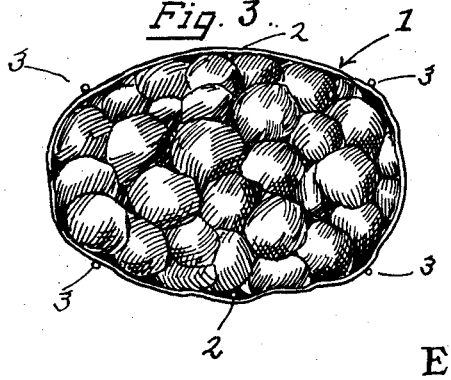
Fig. 3 is a transverse section thereof.

In the embodiment illustrated the feeder constituting this invention is composed of any suitable porous material preferably of loose woven muslin and is constructed in the form of a bag 1 which may be of any desired size according to the quantity of feed to be placed therein which is controlled by the distance the bees are to be shipped and the number to feed therefrom.

This bag 1 has running through the central portion thereof from one open edge to the other a fine wire 2 which is intended to suspend the bag from the top of the cage or from any desirable support and will permit the bag to be collapsed thereon to compress the soft candy and force it through the pores in the bag.

Arranged adjacent each side edge of the bag is a string 3 which strings operate as gathering strings for collapsing the bag longitudinally and exerting a compressing action on the candy to force it out through the pores of the bag.

From the above description it will be obvious that this foraminous cloth feeder may contain very soft candy since the mesh thereof is sufficiently close to prevent the candy from running and yet allow the bees to readily suck their feed through the sack or bag. It has been proven that the bees will not eat away the sack or bag until the candy has all been consumed and after the candy is consumed it is immaterial whether the container is consumed or not.

By placing the gathering strings and wire longitudinally of the bag the bag may be collapsed or drawn up longitudinally forming creases therein and providing perches for the bees to rest on while feeding. This feeder also prevents all possibility of its becoming clogged with dead bees so that those remaining will at all times have access to the feeder and thereby be prevented from starving which is often the case with feeders which become clogged with dead bees during transit.

Should the candy owing to climatic conditions have a tendency to become abnormally soft the softer portion will ooze out through the pores of the bag and that will be first consumed by the bees before they suck out the remainder.

While the preferred embodiment of this invention is disclosed in the drawings and set forth in the specification it will be understood that any modifications may be made in the construction within the scope of the claims without departing from the principle of the invention or sacrificing any of its advantages.

What is claimed is:

1. A bee feeder composed of flexible porous material provided with means for suspending it and permitting the longitudinal collapse thereof.

2. A bee feeder comprising a bag composed of flexible porous material having a suspending element threaded longitudinally therethrough and equipped with means for connecting it to a support.

3. A bee feeder comprising a bag of woven flexible material having laterally spaced drawing strings run longitudinally therethrough and suspending means arranged between said strings.

4. A bee feeder comprising a cloth bag open at one end and closed at the other, a wire threaded longitudinally through said bag from one side edge of the opening to the other midway the width of the bag and adapted to be connected with supporting means, and draw strings extending longitudinally of the bag on opposite sides of said wire.

In testimony whereof, I affix my signature hereto.

EUGENE B. AULT.